Oct. 7, 1947.    L. G. DANIELS    2,428,410
ROTARY TYPE MULTIPORT VALVE
Filed July 30, 1943    3 Sheets-Sheet 1

Inventor:
Lee G. Daniels
By
McCanna, Wintercorn & Morsbach, Attys.

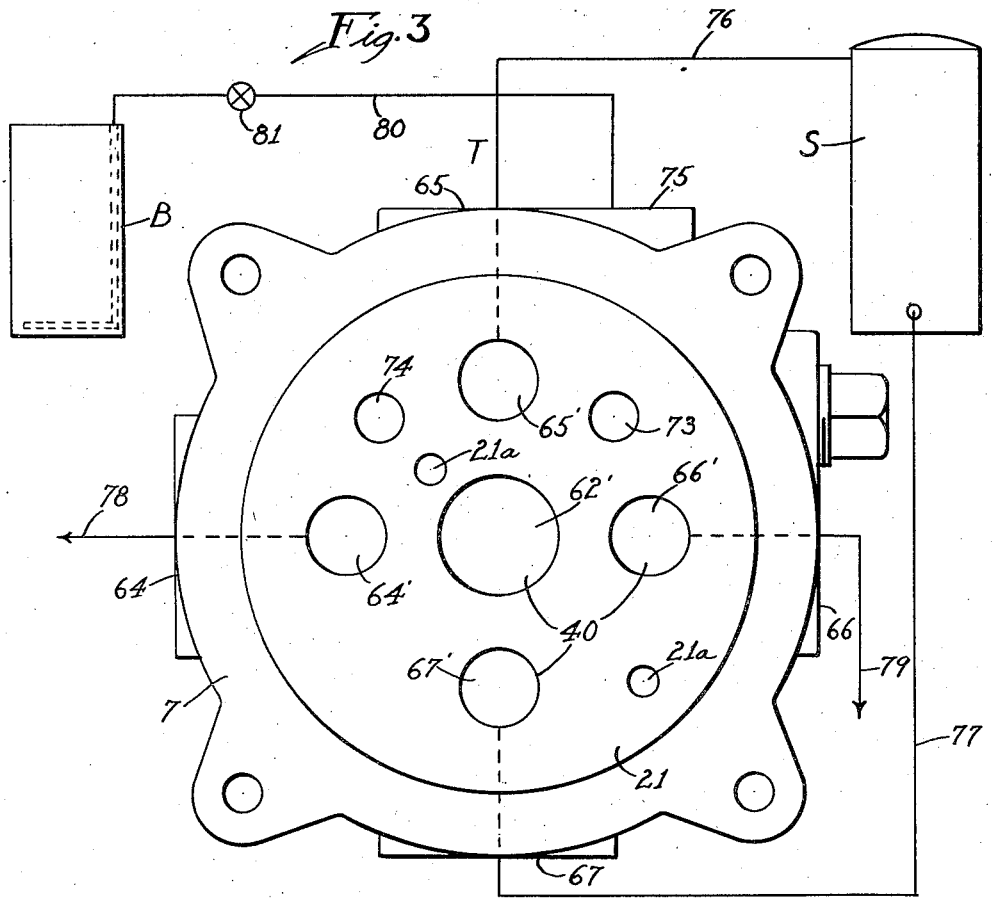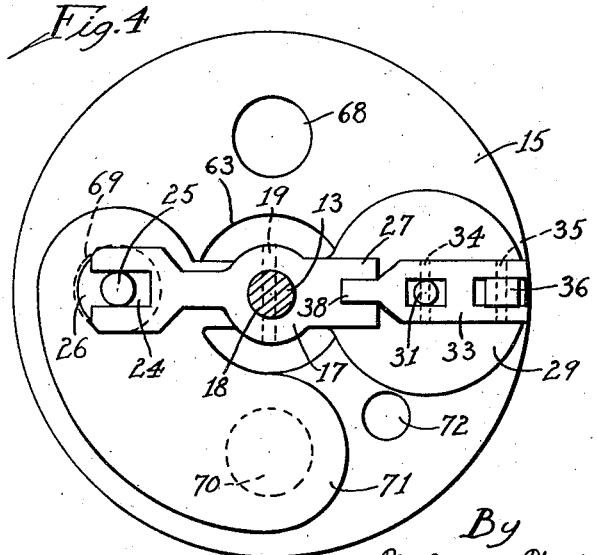

Oct. 7, 1947.　　　　L. G. DANIELS　　　　2,428,410
ROTARY TYPE MULTIPORT VALVE
Filed July 30, 1943　　　3 Sheets-Sheet 3
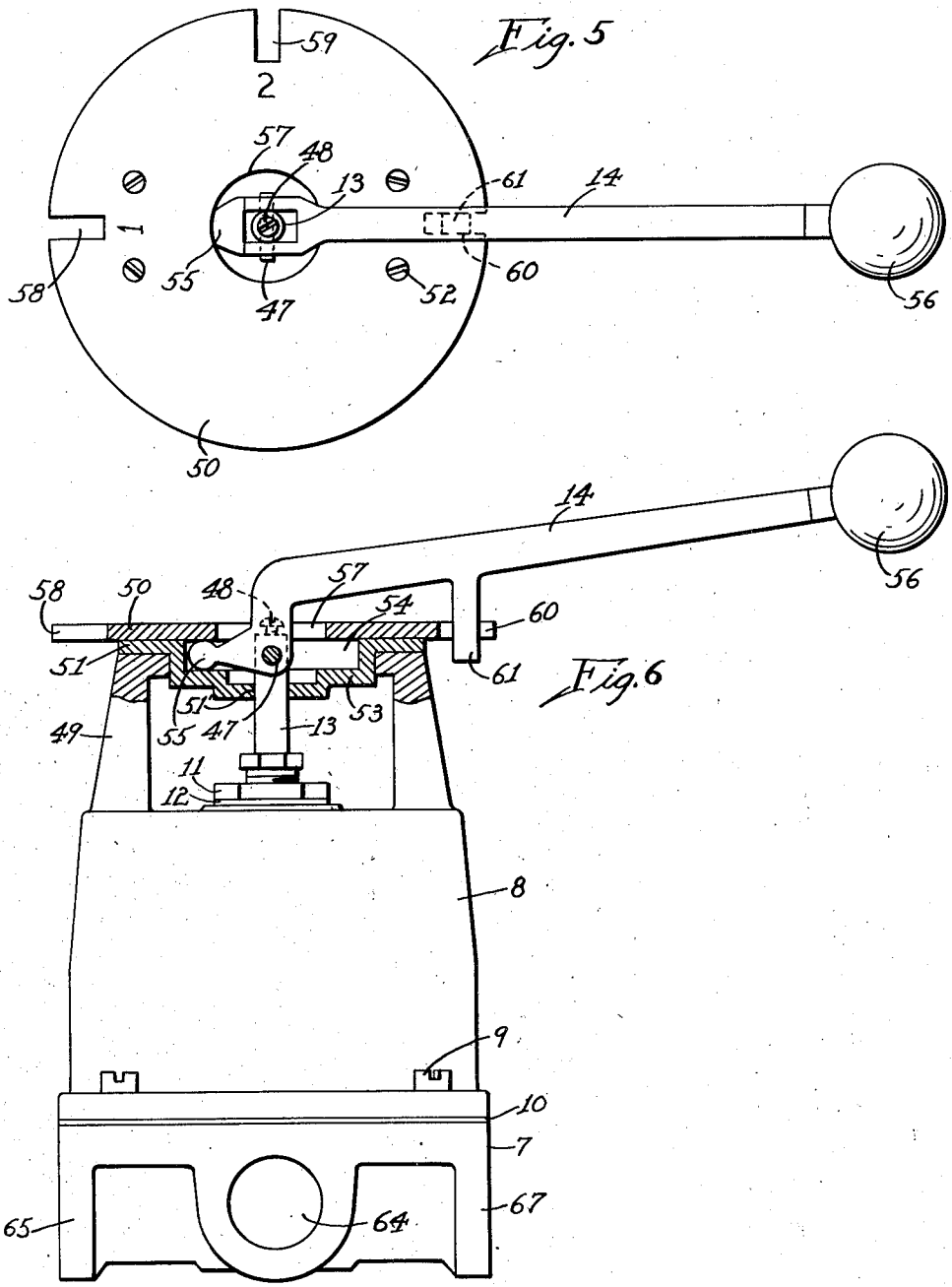

Patented Oct. 7, 1947

2,428,410

UNITED STATES PATENT OFFICE 2,428,410

ROTARY TYPE MULTIPORT VALVE

Lee G. Daniels, Rockford, Ill.

Application July 30, 1943, Serial No. 496,713

18 Claims. (Cl. 277—24)

This invention relates to rotary type multiport valves.

The principal object of my invention is to provide a valve of the kind mentioned, in which the stem plate or rotor that is adapted to be turned from one position to another relative to the stator, either in metal to metal contact or relative to a gasket interposed between these parts, is equipped with a valve liftable off the body whenever the stem plate or rotor is to be turned, whereby to definitely prevent objectionable leakage to the drain port when the valve is in the service position, bearing in mind the fact that there is little, if any, pressure differential between the other ports but appreciable difference in pressure tending to cause leakage at the drain port.

In the valve of my invention a poppet type or liftable valve is provided in the stem plate or rotor for closing the drain port in the service position, and to close other ports in other positions of the rotor and is adapted to seat on the gasket, or gasket means, that is provided on the body for the stem plate, but where the stem plate has metal to metal contact with the body, the liftable valve will be provided with a rubber gasket so as to insure good sealing contact with the body or stator proper. Spring means is provided for normally keeping this auxiliary valve closed, and means is provided, operable in the turning of the stem plate from one position to another, to unseat the auxiliary valve against the action of the aforesaid spring means before the stem plate is turned.

Another object of my invention is to provide a valve of the kind mentioned having an operating lever and a locating plate of simpler and more economical construction and more attractive appearance, the plate being provided with locating slots in the outer peripheral portion for the lever, and the lever having a toe portion on its inner end for sliding fulcrum engagement on the central portion of the locating plate, and having a downwardly projecting lug spaced from the inner end to engage in the locating slots to lock the stem plate in preselected position until the lever is raised preparatory to turning the stem plate from one position to another.

The invention is illustrated in the accompanying drawings, in which—

Fig. 3 is a top view of the body portion of the valve of Fig. 1, with the cover and stem plate removed, and showing diagrammatically the application of the valve to a water softener;

Fig. 4 is a top view of the stem plate with the stem shown in cross-section;

Fig. 5 is a top view of the locating plate and lever, and

Fig. 6 is a side view of the valve taken in a plane at right angles to Fig. 1 but showing the locating plate and adjacent portions in section.

Similar reference numerals are applied to corresponding parts throughout these views.

Figure 1:
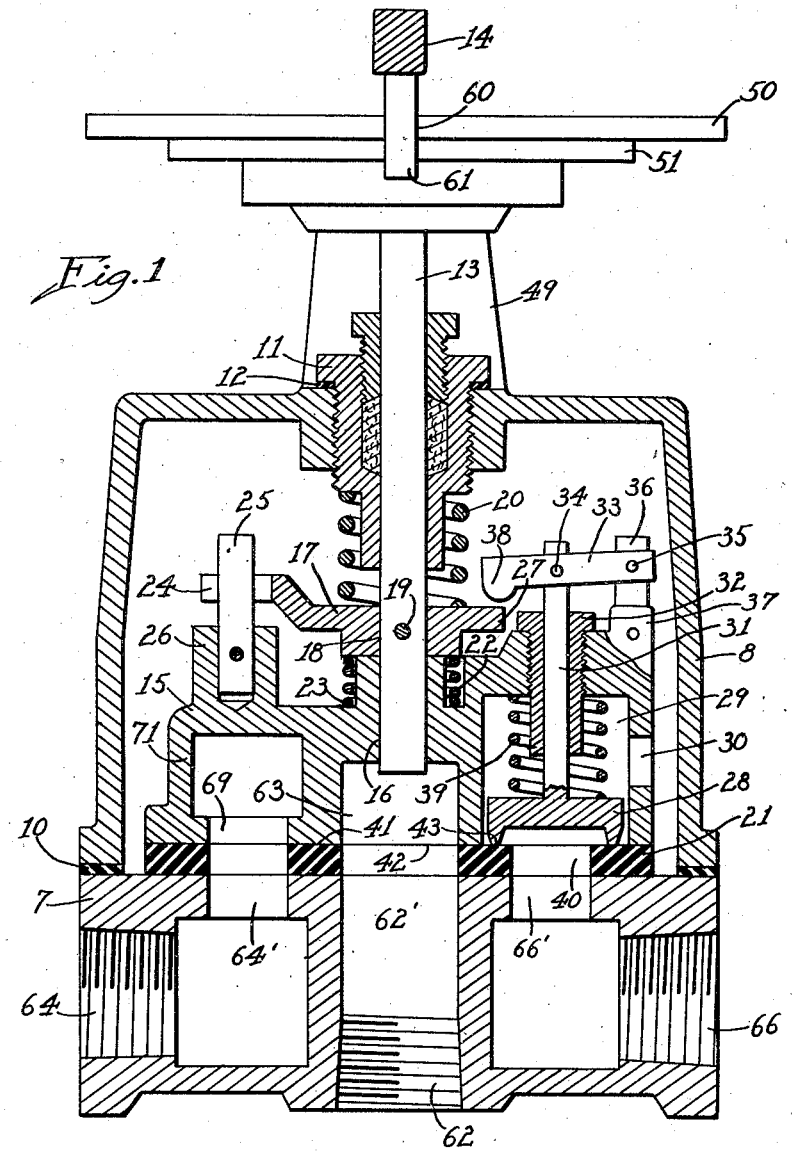
Figure 1 is a section through a rotary multiport valve made in accordance with my invention.

Referring first mainly to Fig. 1, the reference numeral 7 is applied to the body member or stator of the valve on which a cover 8 is suitably secured, as by means of screws 9 (Fig. 6). A gasket ring 10 is interposed between the body and cover to prevent leakage. A stuffing box 11 threads in the center of the top wall of the cover and has a gasket 12 compressed between it and the stuffing box to prevent leakage. The stuffing box contains packing material to prevent leakage along the valve stem 13, which is reciprocable and rotatable by means of a hand lever 14 in the operation of the stem plate or rotor 15. The lower end of the stem 13 is slidable in an axial hole 16 provided therefor in the stem plate. An elongated plate 17 has a hole 18 through which the stem 13 projects, and the stem is pinned to this plate, as indicated at 19. A relatively heavy coiled compression spring 20 surrounds the stem 13 and is compressed between the plate 17 and the stuffing box 11, so as to hold the stem plate 15 seated on a gasket 21, which is preferably though not necessarily of medium hard or hard rubber. A circular recess 22 is provided in the top of the stem plate 15 in concentric relation to the hole 16 to accommodate a relatively light coiled compression spring 23 that is compressed between the stem plate 15 and the plate 17 to keep the stem plate seated under relatively light spring pressure when the stem 13 is raised, as hereinafter described, preliminary to the turning of the stem plate from one position to another. This spring may, however, be dispensed with, inasmuch as there is usually sufficient water pressure active upon the stem plate to keep it seated even when the stem 13 is raised and the pressure of the spring 20 upon the stem plate is accordingly relieved. The plate 17 is forked at one end, as indicated at 24, for a slidable driving connection with a pin 25 that projects upwardly from the stem plate, this pin being suitably secured in a boss 26 thereon. In that way the stem 13 maintains a driving connection with the stem plate 15, so as to permit turning of the stem plate by means of the stem when the stem is raised. The other end 27 of the plate 17 serves as a means for lifting the poppet valve member 28 that is mounted in a chamber 29 in or on the stem plate. This chamber has open communication with the inside of the cover 8 through a hole 30 in the wall of the chamber. The liftable valve member 28 is in movable relation to the rotor 15 and moves at a 90° angle from the ported face thereof. The valve 28 is of a poppet type and has a stem 31 reciprocable in a guide bushing 32 provided therefor in the stem plate. A rocker arm 33 pivoted intermediate its ends, as at 34, to the upper end of the valve stem 31 has one end pivoted, as at 35, to a pin 36 that projects upwardly from the stem plate and is suitably secured in a boss 37 provided thereon. The other end 38 of the rocker arm is disposed over the end 27 of the plate 17, so that when the stem 13 is raised the valve 28 is lifted off the gasket 21 against the action of its coiled compression spring 39 that is interposed between the head of the valve and the stem plate. Bearing in mind the fact that the stem 13 is raised preliminary to the turning of the stem plate from one position to another and is then returned after the stem plate reaches the new position, it should be clear that the valve 28, which is normally held closed by the spring 39 in tight sealing engagement with the gasket 21, will be unseated before the stem plate is turned from one position to another and will be allowed to re-seat after the stem plate has been turned.

Figure 2:
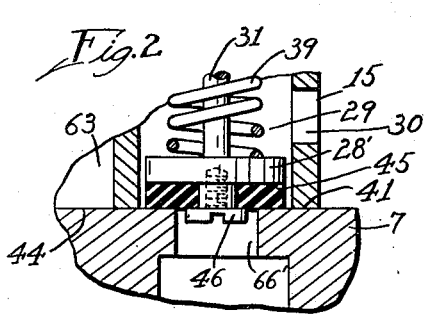
Fig. 2 is a fragmentary sectional detail showing a modified or alternative construction.

The gasket 21 has a plurality of holes 40 provided therein registering with the ports in the body 7, as indicated in Figs. 1 and 3. Dowel pins 21a are indicated in Fig. 3 projecting from the body into holes provided in the gasket to locate the gasket correctly in relation to the ports in the body and prevent displacement of the gasket from such position. Ports provided in the stem plate 15 to register with ports in the body in different positions of the stem plate will, of course, communicate with the body ports through these holes in the different positions of the stem plate, and the gasket 21, therefore, serves primarily to minimize leakage between ports. However, the leakage between most of the ports is negligible, inasmuch as there is usually little or no pressure differential therebetween. However, the leakage to the drain is apt to be appreciable unless some special precaution is taken to provide a better seal at the drain port, because the drain is at atmospheric pressure and there is accordingly a considerable pressure differential tending to cause leakage. The flat bottom surface 41 on the stem plate when seated on the flat top surface 42 on the gasket 21 under pressure of the spring 20 and the pressure of the water in the cover 8 is enough to make all but the drain port fairly water-tight, even though the unit pressure on the stem plate is relatively small. The valve 28, on the other hand, has a projecting circular seat portion that is tapered to provide a relatively narrow seating surface 43, so that the valve when held seated by the spring 39 will be pressed into the gasket under a relatively high unit pressure, there being, of course, hydraulic pressure active on the head of the valve 28, the same as upon the stem plate 15, to further insure a good seal.

Where the gasket 21 is omitted, as shown in Fig. 2, and the flat bottom surface 41 of the stem plate seats directly upon the flat top surface 44 on the body 7, a modified form of valve 28' will be used, having a flat head with a gasket 45 on the seating face thereof, preferably though not necessarily of soft rubber, fastened in place by means of a screw 46. In that way a good water-tight seal is obtained when the valve 28' seats directly on the flat top surface 44 of the body, as shown, and leakage to the drain is eliminated. Leakage between the other ports with such a construction is not apt to be at all serious, even though the stem plate has only metal to metal contact with the body, because, as stated before, there is usually no appreciable pressure differential between these other ports.

The lever 14 for operating the valve is pivotally connected near the inner end to the upper end of the stem 13 by means of a crosspin 47 (Figs. 5 and 6), which is held in place against accidental removal by a screw 48 threaded in an axial hole in the upper end of the stem. Two arms 49 are cast integral with the top of the cover 8 and project upwardly therefrom on diametrically opposite sides of the stem for support of a circular locating plate 50 and another circular plate 51, the two plates being fastened on top of the arms 49 by screws 52. The plate 51 has a depressed central portion 53, so as to provide in addition to a guide 51' in the center thereof for the stem 13 an annular recess 54 under the plate 50 to receive the toe portion 55 forming the end of the lever 14, the toe portion being arranged to fulcrum on the plate 51 when the stem 13 is being raised by means of the lever, and said toe portion being slidable on the plate 51 in the turning of the stem by means of the lever. The toe portion 55 fulcrums on the bottom of the locating plate 50 when the stem 13 is returned to its normal position and in the event the operator applies downward pressure on the knob 56 to press the stem plate firmly into tight sealing contact with the gasket 21. The plate 50 has a hole 57 in the center thereof through which the inner end portion of the lever projects for connection with the upper end of the stem 13, and there are three radial locating slots 58, 59, and 60 provided in the peripheral portion of the plate the slots 59 and 60 being spaced 90° and 180°, respectively, from the slot 58 to receive a downwardly projecting lug 61 provided on the lever 14 intermediate the ends thereof. Thus the valve is adapted to be locked releasably in either of three preselected positions in either of slots 58, 59 and 60, but when the lever is raised far enough to disengage the lug 61 from whichever slot it has been engaged in, it can be turned easily from one position to another, and the lug in this turning movement may, if desired, be allowed to slide on top of the plate 50 so as to drop into the next slot when the lever has been turned far enough. The operator, therefore, has no difficulty whatsoever in setting the valve in one preselected position or another. In the case of a water softener installation, for which the valve of the present invention is particularly suited, the lever 14 is in the "service" position as viewed in Fig. 5, and when turned through 180° to the slot 58 is in the "backwash" position. The slot 59 between these two extreme positions is for the "salt wash" or "brine" position and also "rinse." The lever and locating plate construction just described is much simpler than others provided heretofore, and in addition to being cheaper is considered to be much more attractive in appearance.

Referring to Figs. 1, 3, and 4, it will be seen that the body 7 has a threaded opening 62 in the center thereof for connection with the hard water supply pipe for delivery of water under pressure into the cover 8 through the center hole 63 in the stem plate. The central port 62' in the body with which the hole 62 communicates may, therefore, be referred to as the pressure port. There are four radial threaded holes at 64, 65, 66, and 67 for pipe connection to the body communicating with the ports 64', 65', 66', and 67' in the top of the body spaced 90° apart and equidistant from the pressure port 62'. The stem plate 15 has three ports spaced 90°, 90° and 180° apart and equidistant from the center of the plate, one of these three ports appearing at 68 in Fig. 4, and the other two ports being indicated in dotted lines at 69 and 70, these latter two ports being interconnected by a transfer passage 71. The chamber 29 in which the liftable valve member 28 is provided is spaced 90° from the ports 68 and 70 and disposed at the same radial distance from the center of the stem plate. There is another smaller port 72 in the stem plate between the chamber 29 and the port 70, and this port is at the same radial distance from the center of the plate as the two ports 73 and 74 provided in the body. The port 73 has communication with the port 65' through a brine ejector nozzle, not shown, mounted in the body, for delivery of water mixed with brine to the port 65'. The nozzle is supplied with brine through a hole provided in the body at 75. The port 74 communicates with the port 64' for by-passing water to the service system during regeneration.

In operation, therefore, when the valve is in the service position, hard water delivered to the inside of the cover 8 flows through the port 68 in the stem plate and registering port 65' in the body and through a pipe 76 into the top of the softener tank S for passage downwardly through the water softening material therein. Softened water leaving the bottom of the tank S is conducted through pipe 77 to the port 67' in the body and through ports 70 and 69 to the port 64' and thence to the service system through pipe 78. During the softening operation, the liftable valve 28, with which my invention is particularly concerned, prevents leakage to the drain through port 66', this port being effectively sealed by the impression of the projecting seat portion on the valve 28 in the gasket 21 at that point. Leakage between the other ports is not apt to be serious, because, as stated before, there is little or no pressure differential therebetween. At the end of the service run, when the softening material in the tank S requires regeneration, the lever 14 is raised out of the locating slot 60 and this releases the pressure of spring 20 on the stem plate 15, and the stem plate while still in contact with the gasket 21 is turned or rotated through 180° to the backwash position, numbered 1 in Fig. 5, in which the lug 61 engages in the slot 58. During backwash the incoming hard water is delivered from port 68 through port 67' to the bottom of the softener tank S for passage upwardly through the bed of water softening material. Whatever silt may have collected on top of the bed during the service run will be washed out in the backwash flow, and this waste water leaves the top of the tank through pipe 76 and is conducted through ports 65', 70, and 69 to the drain or waste port 66' and thence to the sewer or other waste receptacle through pipe 79. While the valve is in the backwash position, the valve 28 seals the port 64', but fresh hard water may nevertheless be by-passed to the service system through ports 72 and 74. The bed of water softening material is, of course, loosened up in the backwash and prepared to receive the brine. When a predetermined amount of water has been passed through the bed in the backwash, the lever 14 is raised out of the locating slot 58 and this releases the pressure of spring 20 on the stem plate, and the stem plate is rotated through 90° in a clockwise direction to the salt wash or brine position, numbered 2 in Fig. 5, in which the lug 61 engages in slot 59. The brine valve 81 is then opened. During the salt wash the valve 28 seals the port 65', but hard water is delivered through port 72 to port 73 and thence through the brine ejector nozzle to the pipe 76. The water flowing through the brine ejector nozzle entrains with the brine from the brine tank B which communicates through the pipe 80 with the pipe connection hole 75 in the body of the valve for delivery of brine to the ejector nozzle. The water mixed with brine is delivered into the top of the tank S for passage downwardly through the bed of water softening material. Spent brine leaving the bottom of the tank is conducted through ports 67', 69, and 70 to the drain port 66' and thence to the sewer or other waste receptacle through pipe 79. When a predetermined amount of brine has been used in this way, the valve 81 in the brine pipe is closed, and from that point on only hard water is caused to flow through the bed of water softening material to rinse the same, the rinse being, of course, conducted to the drain similarly as the spent brine. Throughout the salt wash and rinse flows, hard water may be delivered to the service system through ports 68 and 64'. At the end of the rinse flow, when the water going to the drain tests soft, the lever 14 is raised out of the locating slot 59 to release the pressure of spring 20 on the stem plate and the stem plate is turned in a clockwise direction through 90° back to the service position.

The foregoing description and the accompanying drawings show a preferred embodiment of the invention by way of illustration rather than limitation, and I do not wish to be limited except as required by the scope of the appended claims.

I claim:

1. In a plate type multiple port valve, a ported stator having an approximately plane ported face, a ported rotor adapted to be rotated thereon to different positions relative to the ported face, a liftable valve member on the rotor in movable relation thereto and arranged to seat on the ported face closing a port therein in each different position of the rotor, and means for lifting said liftable valve member and rotating the rotor, said means being arranged to lift the liftable valve member before the rotor can be rotated.

2. In a plate type valve, a ported body member, a ported gasket on said body member, a ported rotor member seated on said gasket and adapted to be rotated thereon to different positions to direct fluid flow differently through said body member, said rotor member having a liftable valve member mounted therein eccentric of the axis of said rotor member and for movement relative to said rotor member, said liftable valve member having a lower projecting seating surface adapted to seat on said gasket to close one port in said body member in each position of said rotor member, and cooperating means for lifting said liftable valve member relative to said rotor member, rotating said rotor member, and reseating said liftable valve member.

3. In a plate type valve, a ported body member, a ported rotor member seated on said body member and adapted to be rotated thereon to different positions to direct fluid flow differently through said body member, said rotor member having a liftable valve member movably mounted thereon and arranged to close a different port in said body member in each position of said rotor member, and cooperating means for lifting said liftable valve member, rotating said rotor member, and reseating said liftable valve member.

4. In a plate type multiple port rotary valve, comprising a body member having an approximately plane ported face and a ported rotor rotatable with respect to the body member to different positions for different fluid circuits through the body member, a liftable valve member on the rotor in movable relation thereto and movable toward and away from seating engagement on the ported face, positive means for lifting the liftable valve member and rotating the rotor, and spring means for reseating the liftable valve member.

5. A rotary valve as set forth in claim 4, including gasket means on the body member for fluid-tight seating engagement of the rotor thereon, the liftable valve member on the rotor being arranged to have fluid-tight seating engagement with the same gasket means.

6. A rotary valve as set forth in claim 4, wherein the rotor has direct seating engagement on the body member, the liftable valve member having gasket means thereon for fluid-tight seating engagement of the liftable valve member on the body member.

7. In a plate type multiple port valve, comprising a ported stator, a cover enclosing the ported face thereof, and a ported rotor inside said cover adapted to be rotated to different positions relative to the stator to establish different fluid circuits through the stator, said cover having fluid delivered therein under pressure, and the fluid being directed by the rotor through the stator differently in different positions of the rotor, the rotor being held seated on the stator under fluid pressure, a liftable valve member on the rotor in movable relation thereto and arranged to seat on the stator closing a port therein in each different position of the rotor, said liftable valve member being also held seated under fluid pressure, and means for lifting said liftable valve member and rotating the rotor, said means being arranged to lift said liftable valve member before the rotor can be rotated.

8. In a plate type multiple port valve, comprising a ported stator, a cover enclosing the ported face thereof, and a ported rotor inside said cover adapted to be rotated to different positions relative to the stator to establish different fluid circuits through the stator, said cover having fluid delivered therein under pressure, and the fluid being directed by the rotor through the stator differently in each different position of the rotor, the rotor being held seated on the stator under fluid pressure, a liftable valve member on the rotor in movable relation thereto and arranged to seat on the stator closing a port therein in each different position of the rotor, said liftable valve member being also held seated under fluid pressure, positive means for lifting said liftable valve member and rotating the rotor, and spring means for reseating said liftable valve member.

9. In a plate type valve comprising a ported body member having a supply port, outlet and return ports, a brine port, and service and drain ports, a cover for the ported face of the body member, and a ported stem plate member inside the cover rotatable on the body member to different positions to establish different fluid circuits through the body member, a gasket on the body member whereon the stem plate member seats, said gasket having ports therein establishing communication with the ports in the stem plate member in sealed operative relation to the body member in different positions of the stem plate member under relatively low unit seating pressure, and a liftable valve on the stem plate member in movable relation thereto for sealing the drain port in the body member against leakage in the service position of the valve, the liftable valve being arranged to seat on the gasket with relatively high unit seating pressure.

10. In a plate type valve comprising a ported body member having a supply port, outlet and return ports, a brine port, and service and drain ports, a cover for the ported face of the body member, and a ported stem plate member inside the cover rotatable on the body member to establish different fluid circuits through the body member by different registration of the ports in different positions of rotation of the stem plate member, and a liftable valve on the stem plate member in movable relation thereto for sealing the drain port in the body member against leakage in the service position of the valve and the liftable valve adapted to seat on the body member with relatively high unit seating pressure.

11. In a plate type valve comprising a ported body member having a supply port, outlet and return ports, a brine port, and service and drain ports, a cover for the ported face of the body member, and a ported stem plate member inside the cover rotatable on the body member to establish different fluid circuits through the body member by different registration of the ports in different positions of the stem plate member, a liftable valve mounted on the stem plate member eccentric of the axis of rotation of the stem plate member and in movable relation thereto, the liftable valve adapted to seal the drain port in the body member against leakage in the service position of the valve, and gasket means on the seating face of the liftable valve for sealing engagement on the body member.

12. In a rotary valve of the class described, comprising a ported stator, a ported rotor rotatable on the stator, and a cover on the stator enclosing the rotor, an operating stem reciprocable and rotatable in the cover and having a slidable driving connection with the rotor to turn the same with the stem but permit reciprocation of the stem relative to the rotor, a liftable valve member on the rotor in movable relation thereto and arranged to seat on the stator to close a port therein in each different position of the rotor, spring means for seating the liftable valve member, means reciprocable with the stem for positively unseating the liftable valve member, and means for reciprocating and turning the stem.

13. A valve as set forth in claim 12, including means cooperating with the last mentioned means for releasably locking the stem against turning until the stem is raised, whereby to lock the rotor releasably in preselected positions and prevent turning of the rotor prior to unseating of the liftable valve member.

14. A valve as set forth in claim 12, wherein the means reciprocable with the stem for positively unseating the liftable valve member comprises a plate secured to the stem and arranged to positively unseat the liftable valve member when the stem is raised, the valve including spring means acting between the cover and the plate normally urging the stem downwardly so as normally to hold the rotor seated under spring pressure.

15. A valve as set forth in claim 12, wherein the means reciprocable with the stem for positively unseating the liftable valve member comprises a plate secured to the stem and arranged to positively unseat the liftable valve member when the stem is raised, the valve including spring means acting between the cover and the plate normally urging the stem downwardly so as normally to hold the rotor seated under spring pressure, the valve further including another spring means of lighter loading than the last mentioned spring means and acting between the plate and the rotor to keep the rotor seated under light spring pressure when the stem is raised.

16. In a plate type multiple port valve, comprising a stator having an approximately plane ported face, a cover enclosing the ported face thereof, a ported rotor inside the cover and a stem adapted to rotate the rotor to different positions on the stator to establish different fluid circuits through the stator, the cover having fluid delivered therein under pressure, and the fluid being directed by the rotor through the stator differently in different positions of the rotor, a liftable valve member on the rotor arranged to seat on the stator closing a port therein in each different position of the rotor, means on the stem for lifting the valve member relative to the rotor upon longitudinal movement of the stem, and means for preventing rotation of the stem to rotate the rotor before the valve member is lifted.

17. In a plate type multiple port valve, comprising a stator having an approximately plane ported face, a cover enclosing the ported face thereof, a ported rotor inside the cover and a stem adapted to rotate the rotor to different positions on the stator to establish different fluid circuits through the stator, the cover having fluid delivered therein under pressure and the fluid being directed by the rotor through the stator differently in different positions of the rotor, a liftable valve member on the rotor arranged to seat on the stator closing a port therein in each different position of the rotor, means on the stem for lifting the liftable valve member relative to the rotor upon longitudinal movement of the stem, a handle rotatable in one plane for rotating the stem and in a second plane for moving the stem longitudinally, means engaging the handle for preventing rotation thereof in the first mentioned plane until the liftable valve member has been lifted away from the stator, and spring means for reseating the liftable valve member.

18. In a plate type multiple port valve, comprising a stator having an approximately plane ported face, a cover enclosing the ported face thereof, a ported rotor inside the cover and a stem mounted on said cover for longitudinal and rotary motion with respect to the cover, a plate on the stem for rotating the rotor to different positions on the stator, the cover having fluid delivered therein under pressure and being directed by the rotor through the stator differently in different positions of the rotor, spring means between the cover and the plate for retaining the rotor in seated position against the stator, a liftable valve member on the rotor in movable relation thereto and arranged to seat on the stator closing a port therein in each different position of the rotor, means connected to the liftable valve member engageable by the plate to lift the liftable valve member upon longitudinal movement of the stem in one direction, spring means for reseating the liftable valve member upon longitudinal movement of the stem in the opposite direction, means for moving the stem longitudinally in the one direction to lift the liftable valve member and for rotating the stem to rotate the rotor, spring means acting between the plate and the rotor to hold the rotor seated when the liftable valve member is lifted, and means for preventing rotation of the stem before the liftable valve member is lifted.

LEE G. DANIELS.

REFERENCES CITED

The following references are of record in the file of this patent:

UNITED STATES PATENTS

| Number | Name | Date |
|---|---|---|
| 2,047,131 | Riche | July 7, 1936 |
| 2,093,692 | Daniels | Sept. 21, 1937 |
| 2,331,503 | Ray | Oct. 12, 1943 |
| 2,184,513 | Clade | Dec. 26, 1939 |
| 1,702,017 | Novotney | Feb. 12, 1929 |
| 2,209,991 | McGill | Aug. 6, 1940 |
| 2,111,169 | Clark | Mar. 15, 1938 |
| 1,128,846 | Carroll | Feb. 16, 1915 |
| 1,693,758 | Henessey | Dec. 40, 1928 |
| 2,327,425 | Hilker | Aug. 24, 1943 |

FOREIGN PATENTS

| Number | Country | Date |
|---|---|---|
| 438,691 | Great Britain | Nov. 21, 1935 |